US012578712B2

(12) United States Patent
Shigematsu et al.

(10) Patent No.: US 12,578,712 B2
(45) Date of Patent: Mar. 17, 2026

(54) PROCESSING APPARATUS

(71) Applicant: DISCO CORPORATION, Tokyo (JP)

(72) Inventors: Koichi Shigematsu, Tokyo (JP); Shuichiro Tsukiji, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 357 days.

(21) Appl. No.: 18/328,374

(22) Filed: Jun. 2, 2023

(65) Prior Publication Data

US 2023/0409018 A1 Dec. 21, 2023

(30) Foreign Application Priority Data

Jun. 13, 2022 (JP) ................................. 2022-095216

(51) Int. Cl.
| | |
|---|---|
| *G05B 19/418* | (2006.01) |
| *B23K 26/03* | (2006.01) |
| *B23K 26/364* | (2014.01) |

(52) U.S. Cl.
CPC ...... *G05B 19/41875* (2013.01); *B23K 26/032* (2013.01); *B23K 26/364* (2015.10); *G05B 2219/50325* (2013.01)

(58) Field of Classification Search
None
See application file for complete search history.

(56) References Cited

U.S. PATENT DOCUMENTS

| | | | | |
|---|---|---|---|---|
| 12,265,369 B2 * | 4/2025 | Guo | .................... | G05B 19/4183 |
| 2021/0162544 A1 * | 6/2021 | Fujii | .................... | B23K 26/707 |

FOREIGN PATENT DOCUMENTS

| | | | | |
|---|---|---|---|---|
| JP | 05326700 A | 12/1993 | | |
| JP | 2010271252 A | 12/2010 | | |
| JP | 2015088515 A | 5/2015 | | |
| JP | 2019206074 A | 12/2019 | | |
| WO | WO-2023032054 A1 * | 3/2023 | .............. | G01B 9/02 |
| WO | WO-2023228401 A1 * | 11/2023 | ......... | B23K 26/0648 |

OTHER PUBLICATIONS

Japanese Patent Application No. 2022-095216 : English translation of Office Action, Feb. 3, 2026 (3 pages).

* cited by examiner

*Primary Examiner* — Jared I Rutz
(74) *Attorney, Agent, or Firm* — Greer, Burns & Crain, Ltd

(57) ABSTRACT

A processing apparatus includes a holding unit for holding a workpiece thereon, a processing unit for processing the workpiece held on the holding unit, a moving mechanism for moving the holding unit and the processing unit relatively to each other, a processed state measuring unit for measuring a processed state of the workpiece, and a controller for controlling the processing unit, the moving mechanism, and the processed state measuring unit. The controller acquires processed state information of the workpiece from the processed state measuring unit, acquires vibration information regarding vibrations that are being produced while the processed state information is acquired, links the processed state information and the vibration information that have been acquired with each other, and stores the processed state information and the vibration information that have been linked with each other.

15 Claims, 9 Drawing Sheets

300

| PROCESSED STATE INFORMATION | VIBRATION INFORMATION (OPERATION STATE) |
|---|---|
| PROCESSED STATE INFORMATION 1 | WORKPIECE CLEANING SESSION IN PROGRESS |
| PROCESSED STATE INFORMATION 2 | PROTECTIVE FILM FORMING SESSION IN PROGRESS |
| PROCESSED STATE INFORMATION 3 | DELIVERY IN PROGRESS |
| PROCESSED STATE INFORMATION 4 | NONE |

51

301,302

301

300

| PROCESSED STATE INFORMATION | VIBRATION INFORMATION (OPERATION STATE) |
|---|---|
| PROCESSED STATE INFORMATION 1 | WORKPIECE CLEANING SESSION IN PROGRESS |
| PROCESSED STATE INFORMATION 2 | PROTECTIVE FILM FORMING SESSION IN PROGRESS |
| PROCESSED STATE INFORMATION 3 | DELIVERY IN PROGRESS |
| PROCESSED STATE INFORMATION 4 | NONE |

51

301,302

301

61

300-1

CONTROLLER ~100

PROCESSING
CONTROL SECTION ~101

INFORMATION
ACQUIRING SECTION ~102

STORAGE SECTION ~103

STANDARD DECISION
CRITERION ~105

PROCESSING APPARATUS

BACKGROUND OF THE INVENTION

Field of the Invention

The present invention relates to a processing apparatus for processing a workpiece.

Description of the Related Art

Various methods have been known in the art as processing methods for manufacturing semiconductor devices. According to one of the methods, a laser beam that is absorbable by a wafer is applied to the wafer along streets thereon to form processed grooves in the wafer by way of ablation, and the wafer is split and divided along the processed grooves into individual device chips.

The above processing method is carried out by a processing apparatus including image capturing means such as a microscope or a charge-coupled device (CCD) camera that captures an image of the processed grooves. The processing apparatus checks whether or not the processed grooves have suffered processing abnormalities including positional deviations, chips or breaks, or the like, on the basis of the captured image (see, for example, JP-H5-326700-A)

There has also been proposed a processing apparatus including three-dimensional measuring means for acquiring more detailed information, which is also referred to as processed state information, representing the depths and cross-sectional shapes of processed grooves, the volume of debris, or the like (see, for example, JP-2010-271252-A and JP-2015-88515-A).

SUMMARY OF THE INVENTION

If the processed state information is acquired while the processing apparatus is in operation, however, the acquired processed state information tends to be of poor accuracy on account of vibrations caused by the processing apparatus operating in certain situations. The adverse effect of vibrations manifests itself when the image capturing means captures images at high magnification ratios or the three-dimensional measuring means makes measurements with high accuracy.

Therefore, problems are likely to arise because it is not possible to decide whether or not acquired processed state information is accurate enough, and when sufficiently accurate processed state information is to be acquired, it is necessary to capture images or make measurements again while keeping other components of the processing apparatus at rest, resulting in a reduction in productivity.

It is therefore an object of the present invention to provide a processing apparatus that is able to acquire highly accurate and reliable processed state information without causing a reduction in productivity.

In accordance with an aspect of the present invention, there is provided a processing apparatus including a holding unit for holding a workpiece thereon, a processing unit for processing the workpiece held on the holding unit, a moving mechanism for moving the holding unit and the processing unit relatively to each other, a processed state measuring unit for measuring a processed state of the workpiece, and a controller for controlling the processing unit, the moving mechanism, and the processed state measuring unit. The controller acquires processed state information of the workpiece from the processed state measuring unit, acquires vibration information regarding vibrations that are being produced while the processed state information is acquired, links the processed state information and the vibration information that have been acquired with each other, and stores the processed state information and the vibration information that have been linked with each other.

In the processing apparatus, the vibration information may be represented by an operation state of the processing apparatus.

The processing apparatus may further include a vibration measuring unit for measuring vibration data representing the vibration information.

In the processing apparatus, the controller may acquire again processed state information if the controller decides that the acquired vibration information is represented by a predetermined operation state.

In the processing apparatus, the controller may acquire again processed state information if the controller decides that a vibration value is equal to or larger than an allowable value, from the acquired vibration information.

In the processing apparatus, the controller may store in advance a correlation between processed state information acquired when there are no vibrations and processed state information acquired when there are vibrations, and may correct processed state information that has been newly acquired, to the processed state information acquired when there are no vibrations, on the basis of the correlation.

In the processing apparatus, the controller may be able to establish a decision criterion used in determining whether or not a processed result is acceptable, from the processed state information of the workpiece, and the decision criterion may be variable depending on the magnitude of vibrations represented by the vibration information linked with the processed state information.

In the processing apparatus, the processed state measuring unit may include a three-dimensional measuring unit for three-dimensionally measuring the workpiece along an X-axis, a Y-axis, and a Z-axis that extend perpendicularly to one another.

According to the aspect of the present invention, the processing apparatus makes it possible to acquire the processed state information that is of high reliability while preventing a reduction in productivity.

The above and other objects, features and advantages of the present invention and the manner of realizing them will become more apparent, and the invention itself will best be understood from a study of the following description and appended claims with reference to the attached drawings showing preferred embodiments of the invention.

3

Figure 4:
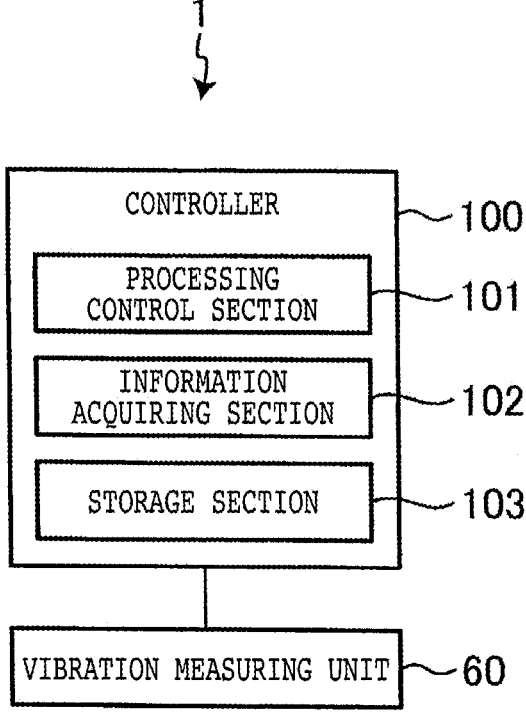
FIG. 4 is a block diagram illustrating a structural example of a processing apparatus according to a modification of the first embodiment.
Figure 5:
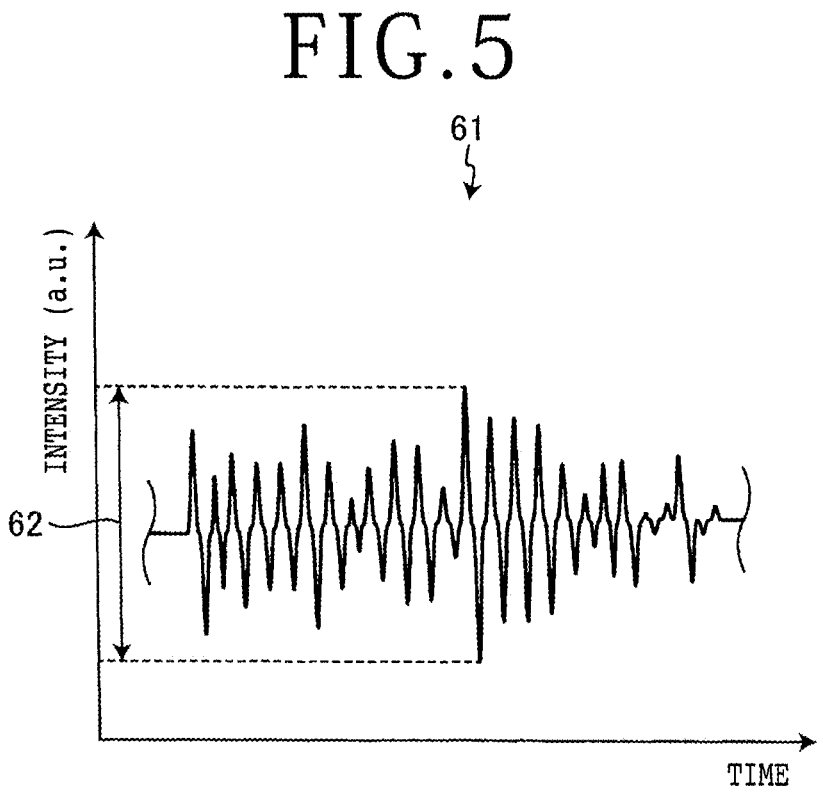
Figure 6:
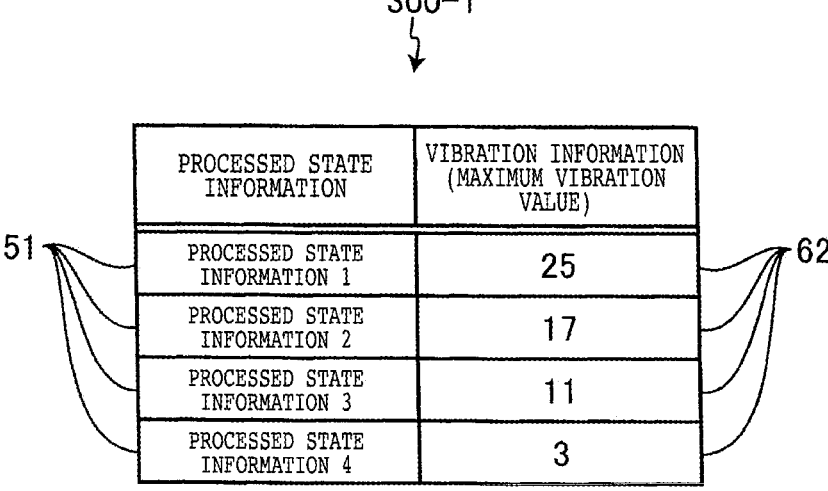
Figure 7:
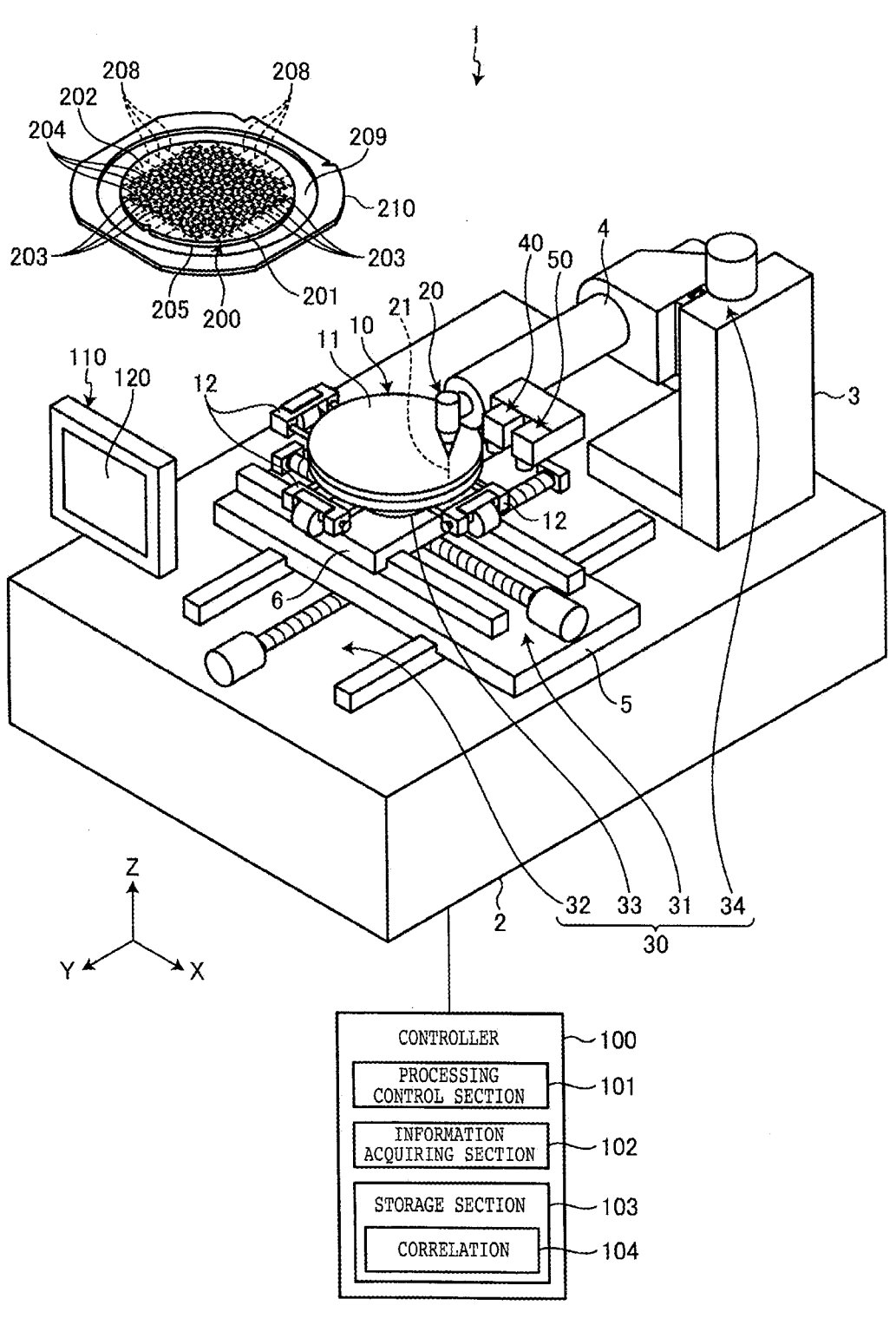
Figure 8:
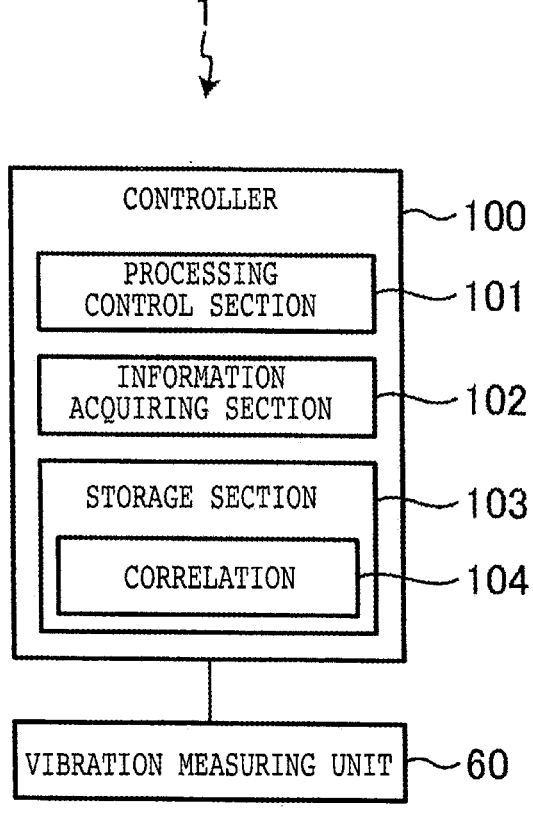
Figure 9:
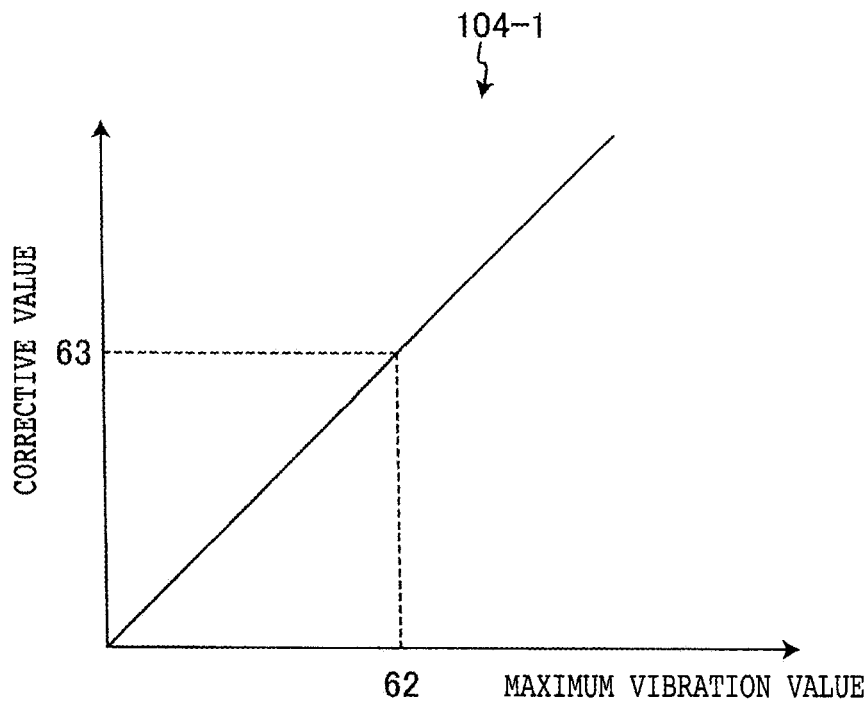
Figure 10:
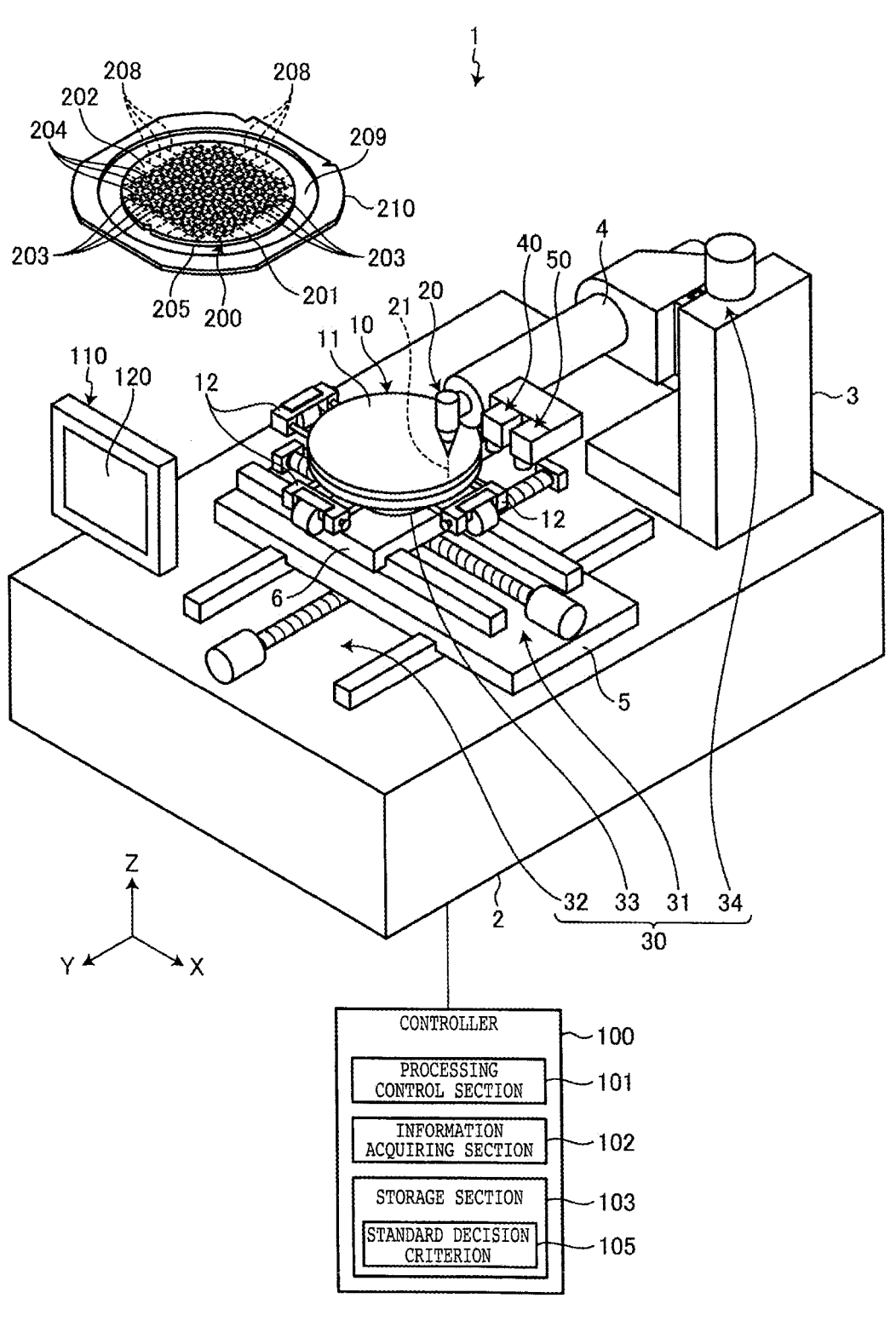
Figure 1:
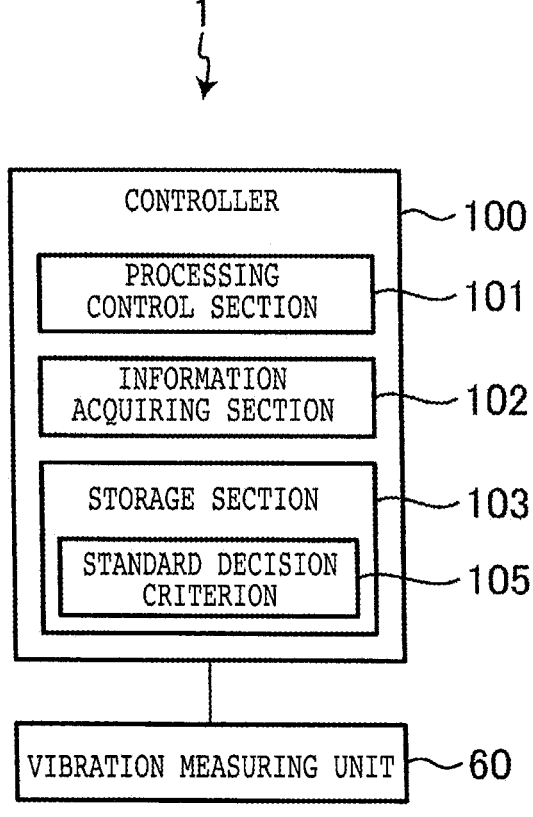

FIG. 5 is a diagram schematically illustrating vibration data acquired by a vibration measuring unit of the processing apparatus illustrated in FIG. 4;

FIG. 6 is a diagram illustrating processed state vibration information that is acquired by an information acquiring section of a controller of the processing apparatus illustrated in FIG. 4 and that is stored in a storage section thereof;

FIG. 7 is a perspective view illustrating a structural example of a processing apparatus according to a second embodiment of the present invention;

FIG. 8 is a block diagram illustrating a structural example of a processing apparatus according to a modification of the second embodiment;

FIG. 9 is a diagram schematically illustrating a correlation stored in a storage section of a controller of the processing apparatus illustrated in FIG. 8;

FIG. 10 is a perspective view illustrating a structural example of a processing apparatus according to a third embodiment of the present invention; and FIG. 11 is a block diagram illustrating a structural example of a processing apparatus according to a modification of the third embodiment.

DETAILED DESCRIPTION OF THE PREFERRED EMBODIMENTS

Preferred embodiments of the present invention will be described in detail hereinbelow with reference to the accompanying drawings. The present invention is not limited to the details of the embodiments described below. The components described below cover those which could easily be anticipated by those skilled in the art and those which are essentially identical to those described below. Further, the arrangements described below can be combined in appropriate manners. Various omissions, replacements, or changes of the arrangements may be made without departing from the scope of the present invention. In the description below, those components that are identical to each other are denoted by identical reference characters.

First Embodiment

Figure 1:
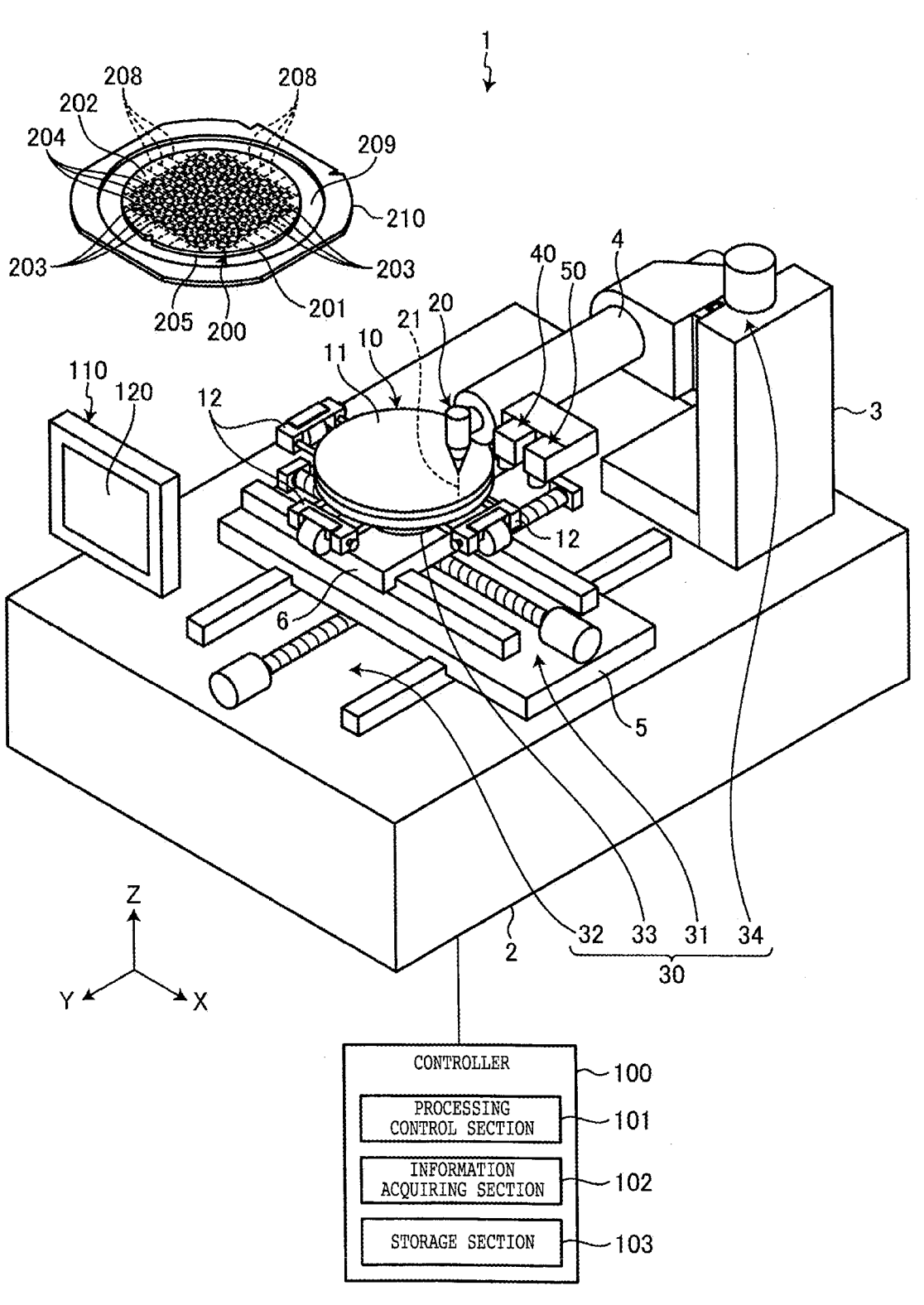
FIG. 1 is a perspective view illustrating a structural example of a processing apparatus according to a first embodiment of the present invention.

A processing apparatus according to a first embodiment of the present invention will be described below with reference to the drawings. FIG. 1 illustrates in perspective a structural example of the processing apparatus, denoted by 1, according to the first embodiment. The processing apparatus 1 according to the first embodiment illustrated in FIG. 1 is a laser processing apparatus that applies a pulsed laser beam 21 to a workpiece 200.
(Workpiece)

The workpiece 200, which is an object to be processed by the processing apparatus 1, is a wafer such as a semiconductor wafer or an optical device wafer that is shaped as a circular plate and that includes a substrate 201 of silicon, sapphire, gallium, or the like. As illustrated in FIG. 1, the workpiece 200 has a plurality of intersecting projected dicing lines 203 that are established on a face side 202 thereof and that demarcate a plurality of areas where respective devices 204 are constructed.

The devices 204 include, for example, integrated circuits (ICs) including large-scale-integration (LSI) circuits or the like, image sensors such as CCDs or complementary-metal-oxide semiconductors (CMOSs), or memories, i.e., semiconductor storage devices.

According to the first embodiment, as illustrated in FIG. 1, the workpiece 200 has a reverse side 205 that is opposite to the face side 202 and that is affixed to an adhesive tape 209 shaped as a circular plate larger in diameter than the workpiece 200. The adhesive tape 209 has an outer edge portion affixed to an annular frame 210 such that the workpiece 200 supported on the adhesive tape 209 is disposed in the opening of the annular frame 210. When the workpiece 200 is processed by the processing apparatus 1, the workpiece 200 is divided into a plurality of individual device chips including the respective devices 204, by the laser beam 21 that is applied to the workpiece 200 along the projected dicing lines 203.

Specifically, the laser beam 21 is a pulsed laser beam having a wavelength absorbable by the substrate 201 and, when being applied to the workpiece 200, has a focused spot placed on the face side 202 of the workpiece 200. When the laser beam 21 is applied to the face side 202 along the projected dicing lines 203, the laser beam 21 forms processed grooves 208, i.e., processed marks, indicated by the broken lines in FIG. 1, in the workpiece 200 along the projected dicing lines 203 by way of ablation.

As illustrated in FIG. 1, the processing apparatus 1 includes a holding unit 10 for holding the workpiece 200 thereon, a laser beam applying unit 20, a moving mechanism 30, an image capturing unit 40, a cassette elevator, not illustrated, a protective film forming and cleaning unit, not illustrated, a delivery unit, not illustrated, and a controller, i.e., a control unit, 100.

The holding unit 10 holds the workpiece 200 on a holding surface 11 thereof that lies parallel to a horizontal plane. The holding surface 11 is shaped as a disc made of porous ceramic or the like and is fluidly connected to a vacuum suction source, not illustrated, through a suction channel, not illustrated. When the vacuum suction source is actuated, it generates and transmits a suction force through the suction channel to the holding surface 11, holding the workpiece 200 under suction on the holding surface 11. A plurality of clamps 12 are disposed at spaced angular intervals around the holding unit 10 to clamp the annular frame 210 with the workpiece 200 positioned in the central opening thereof and supported on the adhesive tape 209.

The holding unit 10 is rotatable about an axis that is perpendicular to the holding surface 11 and that is parallel to a Z-axis parallel to vertical directions, by a rotating unit 33 of the moving mechanism 30. The holding unit 10 is also movable together with the rotating unit 33 along an X-axis parallel to horizontal directions by an X-axis moving unit 31 of the moving mechanism 30, and along a Y-axis parallel to horizontal directions and perpendicular to the X-axis by a Y-axis moving unit 32 of the moving mechanism 30. The holding unit 10 is further movable by the moving mechanism 30 between a processing region where the workpiece 200 can be processed below the laser beam applying unit 20 and a loading/unloading region where the workpiece 200 can be loaded and unloaded spaced from the processing region.

The moving mechanism 30 moves the holding unit 10 and the focused spot of the laser beam 21 emitted from the laser beam applying unit 20, relatively to each other along the X-axis, the Y-axis, the Z-axis, and about the axis parallel to the Z-axis. The X-axis and the Y-axis extend perpendicularly to each other and are parallel to the holding surface 11 that lies horizontally. The Z-axis extends perpendicularly to the X-axis and the Y-axis. In FIG. 1, the X-axis, the Y-axis, and the Z-axis are represented by respective directions indicated by arrows X, Y, and Z.

The moving mechanism 30 includes the X-axis moving unit 31 as a processing feed unit for moving the holding unit 10 along the X-axis, the Y-axis moving unit 32 as an indexing feed unit for moving the holding unit 10 along the Y-axis, the rotating unit 33 for rotating the holding unit 10 about the axis parallel to the Z-axis, and a Z-axis moving unit 34 for moving, along the Z-axis, the focused spot of the laser beam 21 emitted from the laser beam applying unit 20.

The Y-axis moving unit 32 is an indexing feed unit for moving the holding unit 10 and the focused spot of the laser beam 21 emitted from the laser beam applying unit 20, relatively to each other along the Y-axis. According to the first embodiment, the Y-axis moving unit 32 is disposed on an apparatus base 2 of the processing apparatus 1. The Y-axis moving unit 32 supports a movable plate 5 on which the X-axis moving unit 31 is supported, such that the movable plate 5 is movable along the Y-axis.

The X-axis moving unit 31 is a processing feed unit for moving the holding unit 10 and the focused spot of the laser beam 21 emitted from the laser beam applying unit 20, relatively to each other along the X-axis. The X-axis moving unit 31 is disposed on the movable plate 5. The X-axis moving unit 31 supports a movable plate 6 on which the rotating unit 33 for rotating the holding unit 10 about the axis parallel to the Z-axis is supported, such that the movable plate 6 is movable along the X-axis. The movable plate 6 supports the rotating unit 33 and the holding unit 10 thereon. The rotating unit 33 supports the holding unit 10 thereon.

The Z-axis moving unit 34 is a feed unit for moving the holding unit 10 and the focused spot of the laser beam 21 emitted from the laser beam applying unit 20, relatively to each other along the Z-axis. The Z-axis moving unit 34 is disposed on an upstanding wall 3 erected on the apparatus base 2. The Z-axis moving unit 34 supports a support beam 4 having a distal end portion that houses a condensing lens, etc., to be described later, of the laser beam applying unit 20, such that the support beam 4 is movable along the Z-axis.

The X-axis moving unit 31, the Y-axis moving unit 32, and the Z-axis moving unit 34 include respective known ball screws that are rotatable about respective central axes thereof and that move the movable plates 5 and 6 and the support beam 4 respectively along the X-axis, the Y-axis, and the Z-axis when being rotated about their central axes, respective known stepping motors for rotating the ball screws about their respective central axes when being energized, and known respective pairs of guide rails on which the movable plates 5 and 6 and the support beam 4 are movably supported for movement along the X-axis, the Y-axis, and the Z-axis. The rotating unit 33 includes an electric motor for rotating the holding unit 10 about the axis parallel to the Z-axis.

The processing apparatus 1 further includes an X-axis position detecting unit, not illustrated, for detecting the position of the holding unit 10 along the X-axis, a Y-axis position detecting unit, not illustrated, for detecting the position of the holding unit 10 along the Y-axis, and a Z-axis position detecting unit, not illustrated, for detecting the position of the support beam 4 along the Z-axis. Each of the X-axis, Y-axis, and Z-axis position detecting units outputs a signal representing the detected position to the controller 100.

The laser beam applying unit 20 is a processing unit that applies a focused spot of the pulsed laser beam 21 to the workpiece 200 held on the holding surface 11 of the holding unit 10, thereby processing the workpiece 200 with the laser beam 21. According to the first embodiment, as illustrated in FIG. 1, the laser beam applying unit 20 includes some components disposed on the distal end of the support beam 4 that is supported on the Z-axis moving unit 34 disposed on the upstanding wall 3 erected on the apparatus base 2.

The laser beam applying unit 20 includes a laser oscillator for emitting the pulsed laser beam 21 and a condensing lens as a beam condenser for focusing the laser beam 21 emitted from the laser oscillator and applying the focused spot of the laser beam 21 to the workpiece 200. According to the first embodiment, the laser beam 21 applied by the laser beam applying unit 20 to the workpiece 200 held on the holding unit 10 has a wavelength absorbable by the substrate 201, so that the applied laser beam 21 performs ablation processing on the workpiece 200.

The image capturing unit 40 captures an image of the workpiece 200 held on the holding unit 10. The image capturing unit 40 includes an image capturing device such as a CCD or a CMOS device and has an objective lens facing along the Z-axis. According to the first embodiment, as illustrated in FIG. 1, the image capturing unit 40 is disposed on the distal end of the support beam 4 at a position alongside of the condensing lens of the laser beam applying unit 20 along the X-axis.

The image capturing unit 40 acquires image data of an image captured by the image capturing device and outputs the acquired image data to the controller 100. Moreover, the image capturing unit 40 also captures an image of the workpiece 200 held on the holding surface 11 of the holding unit 10, acquires image data of the captured image for use in an alignment step of positioning the workpiece 200 with respect to the laser beam applying unit 20, and outputs the acquired image data to the controller 100.

Figures 2, 3:
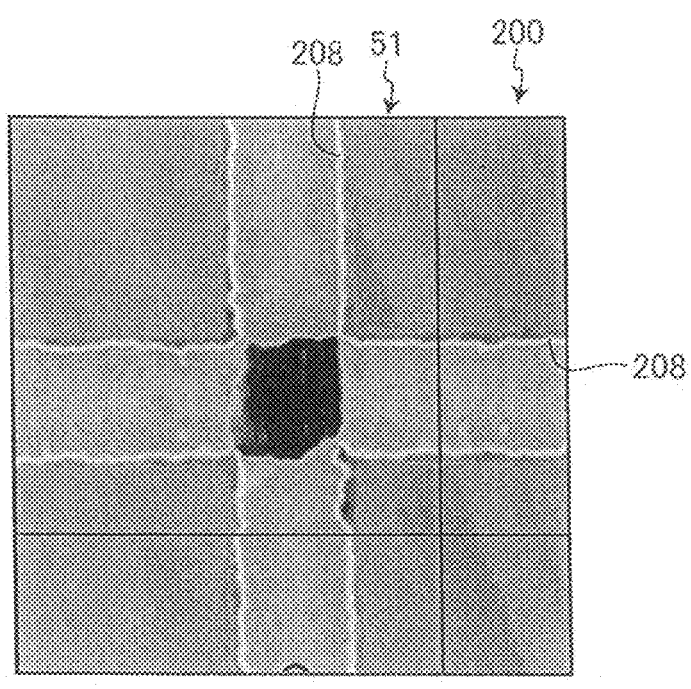
FIG. 2 is a view illustrating an example of processed state information of a workpiece acquired by a processed state measuring unit of the processing apparatus illustrated in FIG. 1.
FIG. 3 is a diagram illustrating processed state vibration information that is acquired by an information acquiring section of a controller of the processing apparatus illustrated in FIG. 1 and that is stored in a storage section thereof.

As illustrated in FIG. 1, the processing apparatus 1 includes a processed state measuring unit 50. The processed state measuring unit 50 will be described in detail below. FIG. 2 illustrates an example of processed state information 51 of the workpiece 200 acquired by the processed state measuring unit 50 of the processing apparatus 1 illustrated in FIG. 1. The processed state measuring unit 50 measures information regarding a processed groove 208 representing a processed state of the workpiece 200 on the holding unit 10.

According to the first embodiment, the processed state measuring unit 50 is disposed adjacent to the image capturing unit 40 along the X-axis at a position alongside of the condensing lens of the laser beam applying unit 20 and the objective lens of the image capturing unit 40 along the X-axis. The processed state measuring unit 50 is a three-dimensional measuring unit for measuring the three-dimensional shape of a processed groove 208 in the workpiece 200 that is defined along the X-axis, the Y-axis, and the Z-axis, which are perpendicular to each other. The three-dimensional shape of the processed groove 208 corresponds to information regarding the processed groove 208, i.e., processed information, and will be referred to as the processed state information 51 illustrated in FIG. 2.

The processed state information 51 illustrated in FIG. 2 that is acquired by the processed state measuring unit 50 measuring a shape of the processed groove 208 refers to information representing the three-dimensional shape of a processed groove 208 in the workpiece 200 and a peripheral area around the processed groove 208. According to the first embodiment, the processed state measuring unit 50 is a three-dimensional measuring unit for measuring the three-dimensional shape of a processed groove 208 in the workpiece 200 and a peripheral area around the processed groove 208 as the processed state information 51, as described above. According to the present invention, however, the processed state measuring unit 50 is not limited to such details and may acquire information representing the two-dimensional shape, i.e., a two-dimensional image, of a processed groove 208 in the workpiece 200 and a peripheral area around the processed groove 208 along the X-axis and the Y-axis as the processed state information 51.

According to the first embodiment, the processed state measuring unit 50 is constructed as a known laser microscope or a line sensor, though it may be constructed as a known microscope that acquires a two-dimensional image.

According to the first embodiment, since the processed state information 51 is information representing the three-dimensional shape of a processed groove 208 in the workpiece 200 and a peripheral area of the processed groove 208, it contains the minimum width of the processed groove 208 at the face side 202, the maximum width of the processed groove 208 at the face side 202, the width of the processed groove 208 at the bottom surface thereof, the width of the processed groove 208 at a position spaced a predetermined distance from the face side 202 toward the bottom surface, the average depth of the processed groove 208, the maximum depth of the processed groove 208, the minimum depth of the processed groove 208, and the surface roughness of the bottom surface of the processed groove 208. However, it is sufficient if the processed state information 51 contains at least one of the minimum width of the processed groove 208 at the face side 202, the maximum width of the processed groove 208 at the face side 202, the width of the processed groove 208 at the bottom surface thereof, the width of the processed groove 208 at a position spaced a predetermined distance from the face side 202 toward the bottom surface, the average depth of the processed groove 208, the maximum depth of the processed groove 208, the minimum depth of the processed groove 208, or the surface roughness of the bottom surface of the processed groove 208.

The cassette elevator supports thereon a cassette that houses a plurality of workpieces 200 that either are to be processed or have been processed. The cassette elevator moves the cassette with the workpieces 200 housed therein along the Z-axis. The protective film forming and cleaning unit coats the face side 202 of a workpiece 200 to be processed, with a water-soluble resin, to form a protective film of the resin on the face side 202 of the workpiece 200, and cleans the protective film off the face side 202 of the workpiece 200. The water-soluble resin includes, for example, polyvinyl alcohol (PVA), polyvinylpyrrolidone (PVP), or the like. The delivery unit unloads a workpiece 200 to be processed from the cassette, delivers the workpiece 200 to the protective film forming and cleaning unit and then to the holding unit 10, delivers a workpiece 200 that has been processed from the holding unit 10 to the protective film forming and cleaning unit, and loads the workpiece 200 that has been cleaned into the cassette.

The controller 100 controls the above-described components of the processing apparatus 1 to enable the processing apparatus 1 to process workpieces 200. The controller 100 includes a computer that has a processing device having a microprocessor such as a central processing unit (CPU), a storage device having a memory such as a read only memory (ROM) and a random access memory (RAM), and an input/output interface device. The processing device of the controller 100 performs processing operations according to computer programs stored in the storage device, to generate control signals for controlling the processing apparatus 1, and outputs the control signals through the input/output interface device to the components of the processing apparatus 1, thereby serving the functions of the controller 100.

The processing apparatus 1 further includes a display unit 110 as display means such as a liquid crystal display device for displaying states and images of processing operations, an input unit 120 as input means to be used by an operator to enter processing conditions, etc., and a signaling unit, not illustrated. The display unit 110, the input unit 120, and the signaling unit are electrically connected to the controller 100. The input unit 120 is constructed as a touch panel included in the display unit 110. The signaling unit generates and transmits at least any of sound, light, or messages on the display unit 110, giving necessary information to the operator.

As illustrated in FIG. 1, the controller 100 includes a processing control section 101, an information acquiring section 102, and a storage section 103. FIG. 3 illustrates processed state vibration information 300 that is acquired by the information acquiring section 102 of the controller 100 of the processing apparatus 1 illustrated in FIG. 1 and that is stored in the storage section 103.

The processing control section 101 controls the components of the processing apparatus 1 to enable them to process workpieces 200. The information acquiring section 102 acquires the processed state information 51 of the workpiece 200 from the processed state measuring unit 50, acquires vibration information regarding vibrations of the processing apparatus 1 that are being produced while the information acquiring section 102 acquires the processed state information 51, links the vibration information with the processed state information 51, and stores them as processed state vibration information 300 illustrated in FIG. 3 in the storage section 103.

According to the first embodiment, the information acquiring section 102 acquires the processed state information 51 of the workpiece 200 from the processed state measuring unit 50 and acquires, from the processing control section 101, an operation state 301 of the processing apparatus 1 that represents vibration information at the time when the processed state measuring unit 50 has started acquiring the processed state information 51. The information acquiring section 102 links the processed state information 51 acquired from the processed state measuring unit 50 and the operation state 301 of the processing apparatus 1 that represents the vibration information acquired from the processing control section 101, with each other in one-to-one correspondence, and stores them as processed state vibration information 300 in the storage section 103, as illustrated in FIG. 3.

According to the first embodiment, the vibration information is represented by the operation state 301 of the processing apparatus 1. The processed state vibration information 300 illustrated in FIG. 3 includes, as the operation state 301 of the processing apparatus 1 that represents the vibration information, a cleaning session in progress of the protective film forming and cleaning unit on the workpiece 200, a protective film forming session in progress of the protective film forming and cleaning unit on the workpiece 200, and a delivering session in progress of the delivery unit on the workpiece 200.

The information acquiring section 102 decides whether or not the operation state 301 of the processing apparatus 1 that represents the vibration information acquired from the processing control section 101 is a predetermined operation state 302. The predetermined operation state 302 refers to an operation state 301 of the processing apparatus 1 in which the amplitude of the vibrations measured by the processed state measuring unit 50 is larger than an operation state 301 of the processing apparatus 1 other than the predetermined operation state 302, resulting in a reduction in the reliability of the processed state information 51 acquired from the processed state measuring unit 50. According to the first embodiment, the predetermined operation state 302 represents, for example, a cleaning session in progress of the protective film forming and cleaning unit on the workpiece 200 or a protective film forming session in progress of the protective film forming and cleaning unit on the workpiece 200. According to the present invention, the predetermined operation state 302 may not necessarily be limited to those sessions.

If the information acquiring section 102 decides that the operation state 301 of the processing apparatus 1 that represents the vibration information acquired from the processing control section 101 is the predetermined operation state 302, then the information acquiring section 102 acquires again the processed state information 51 from the processed state measuring unit 50. The re-acquisition of the processed state information 51 from the processed state measuring unit 50 may be carried out after the operation state 301 of the processing apparatus 1 acquired from the processing control section 101 has become an operation state 301 other than the predetermined operation state 302. Alternately, the re-acquisition of the processed state information 51 from the processed state measuring unit 50 may be carried out by acquiring, from the processed state measuring unit 50, the processed state information 51 of a processed groove 208 next to the processed groove 208 whose processed state information 51 has been acquired from the processed state measuring unit 50, or may be carried out by acquiring, from the processed state measuring unit 50, the processed state information 51 of the same processed groove 208 as the processed groove 208 whose processed state information 51 has been acquired from the processed state measuring unit 50.

The storage section 103 stores the processed state vibration information 300 therein.

The functions of the processing control section 101 and the information acquiring section 102 are fulfilled by the processing device that performs processing operations according to the computer programs stored in the storage device. The functions of the storage section 103 are fulfilled by the storage device referred to above.

Next, a processing operation of the processing apparatus 1 arranged as described above will be described below. The controller 100 of the processing apparatus 1 accepts processing conditions entered by the operator and registers the processing conditions. A cassette housing a plurality of workpieces 200 therein is placed on the cassette elevator. When the controller 100 accepts an instruction from the operator to start the processing operation, the controller 100 controls the processing apparatus 1 to start the processing operation. In the processing operation, the processing control section 101 of the controller 100 controls the delivery unit to take a workpiece 200 out of the cassette and place the workpiece 200 on the holding surface 11 of the holding unit 10 positioned in the loading/unloading region with the face side 202 of the substrate 201 facing upwardly and the adhesive tape 209 interposed between the workpiece 200 and the holding surface 11.

Then, the processing control section 101 actuates the vacuum suction source fluidly connected to the holding surface 11, creating and transmitting a suction force through the suction channel to the holding surface 11, holding the workpiece 200 under suction on the holding surface 11 with the adhesive tape 209 interposed therebetween. The processing control section 101 also actuates the clamps 12 to clamp the annular frame 210. The processing control section 101 controls the moving mechanism 30 to move the holding unit 10 to the processing region below the laser beam applying unit 20. The processing control section 101 then controls the image capturing unit 40 to capture an image of the workpiece 200 held under suction on the holding unit 10, acquiring image data of the captured image, and performs the alignment step on the basis of the acquired image data to position the focused spot of the laser beam 21 emitted from the laser beam applying unit 20 into alignment with one of the projected dicing lines 203 on the face side 202 of the workpiece 200.

The processing control section 101 controls the Z-axis moving unit 34 to vertically position the condensing lens of the laser beam applying unit 20 such that the focused spot of the laser beam 21 is placed on the face side 202 of the substrate 201 in alignment with the projected dicing line 203. The processing control section 101 controls the moving mechanism 30 to move the holding unit 10 and the focused spot of the laser beam 21 relatively with respect to each other along the projected dicing line 203 while controlling the laser beam applying unit 20 to apply the pulsed laser beam 21 downwardly to the face side 202 in alignment with the projected dicing line 203.

According to the first embodiment, since the wavelength of the laser beam 21 is absorbable by the substrate 201 of the workpiece 200, the laser beam 21 forms a processed groove 208 that is recessed in the face side 202 along the projected dicing line 203 by way of ablation. When the processing apparatus 1 has applied the laser beam 21 in the face side 202 of the workpiece 200 along all the projected dicing lines 203 while relatively moving the holding unit 10 and the focused spot of the laser beam 21, the processing apparatus 1 stops applying the laser beam 21 from the laser beam applying unit 20 to the workpiece 200. Then, the processing apparatus 1 moves the holding unit 10 to the loading/unloading region. The processing control section 101 positions the holding unit in the loading/unloading region, controls the holding unit 10 to stop holding the workpiece 200 under suction, controls the clamps 12 to release the annular frame 210, and controls the delivery unit to deliver the processed workpiece 200 from the holding unit 10 to the protective film forming and cleaning unit in which the workpiece 200 is to be cleaned.

According to the first embodiment, when the workpiece 200 has been cleaned by the protective film forming and cleaning unit, the processing control section 101 controls the delivery unit to deliver the cleaned workpiece 200 from the protective film forming and cleaning unit into the cassette. Thereafter, the processing apparatus 1 processes the workpieces 200 from the cassette in succession with the laser beam, as described above. After the processing apparatus 1 has processed all the workpieces 200 from the cassette with the laser beam and stored all the processed workpieces 200 back in the cassette, the processing operation of the processing apparatus 1 comes to an end.

At a predetermined activity timing while in the processing operation, the processing apparatus 1 interrupts the application of the laser beam 21 and performs a kerf check as described below. The predetermined activity timing refers to each sequence of processing a given number of projected dicing lines 203 with a laser beam, for example. In the kerf check, the processing control section 101 controls the moving mechanism 30 to move the holding unit 10 until a processed groove 208 at a predetermined position that is set according to the processing conditions for the workpiece 200 held on the holding unit 10 is positioned below the image capturing unit 40. Then, the processing control section 101 controls the image capturing unit 40 to capture an image of the workpiece 200 at a predetermined position, detects the processed groove 208 from the image captured by the image capturing unit 40, and detects the width of the processed groove 208, the position of the processed groove 208 relative to a projected dicing line 203, the number and sizes of breaks, which is also referred to as chips, on both edges of the processed groove 208, etc.

In the kerf check, the processing control section 101 decides whether or not each of the detected values, i.e., the width of the processed groove 208, the position of the processed groove 208 relative to the projected dicing line 203, the number and sizes of breaks or chips on both edges of the processed groove 208, etc., falls within a predetermined allowable range. If the processing control section 101 decides that each of the detected values does not fall within the allowable range, then the processing control section 101 energizes the signaling unit to indicate necessary information and finishes the processing operation. Conversely, if the processing control section 101 decides that each of the detected values falls within the allowable range, then the processing control section 101 brings the kerf check to an end and resumes the processing operation. In the resumed processing operation, the processing control section 101 adjusts the relative position of the focused spot of the laser beam 21 with respect to the projected dicing line 203 on the basis of the relative position of the processed groove 208 with respect to the projected dicing line 203 that has been acquired in the preceding kerf check, in order to form a processed groove 208 in a predetermined position on the projected dicing line 203, e.g., in a transversely central position on the projected dicing line 203.

According to the first embodiment, before the processing apparatus 1 finishes the kerf check and resumes the processing operation, the processing apparatus 1 acquires the processed state vibration information 300. For acquiring the processed state vibration information 300, the information acquiring section 102 of the controller 100 controls the moving mechanism 30 to move the holding unit 10 until a processed groove 208 at a predetermined position that is set according to the processing conditions for the workpiece 200 held on the holding unit 10 is positioned below the processed state measuring unit 50. The information acquiring section 102 of the controller 100 controls the processed state measuring unit 50 to acquire the processed state information 51 of the workpiece 200, acquires the operation state 301 of the processing apparatus 1 that represents vibration information regarding vibrations of the processing apparatus 1 that are being produced while the information acquiring section 102 acquires the processed state information 51, links the acquired processed state information 51 and the acquired operation state 301 of the processing apparatus 1 with each other in one-to-one correspondence, and stores them as processed state vibration information 300 in the storage section 103.

According to the first embodiment, if the information acquiring section 102 decides that the operation state 301 of the processing apparatus 1 that represents the vibration information acquired from the processing control section 101 is the predetermined operation state 302, then the information acquiring section 102 acquires again the processed state information 51 from the processed state measuring unit 50, links the re-acquired processed state information 51 and the operation state 301 of the processing apparatus 1 that represents the vibration information, with each other in one-to-one correspondence, and stores them as processed state vibration information 300 in the storage section 103.

Inasmuch as the processing apparatus 1 according to the first embodiment as described above links the processed state information 51 and the operation state 301 of the processing apparatus 1 that represents the vibration information, with each other in one-to-one correspondence, and stores them as processed state vibration information 300 in the storage section 103, the reliability of the processed state information 51 is made clear. Further, the reliability of the processed state information 51 can easily be checked by checking the operation state of the processing apparatus 1 that is linked with the processed state information 51, and thus, only highly reliable processed state information 51 can be used.

In addition, inasmuch as the processing apparatus 1 according to the first embodiment re-acquires the processed state information 51 only when the information acquiring section 102 has decided whether or not the operation state 301 of the processing apparatus 1 that is linked with the processed state information 51 is the predetermined operation state 302, and has acquired the processed state information 51 that is of low reliability, the processing apparatus 1 contributes to an increase in productivity.

Consequently, the processing apparatus 1 according to the first embodiment makes it possible to acquire the processed state information 51 that is of high reliability while preventing a reduction in productivity.

[Modification]

A processing apparatus according to a modification of the first embodiment will be described below with reference to the drawings. FIG. 4 illustrates a structural example of the processing apparatus, denoted by 1, according to the modification of the first embodiment. FIG. 5 schematically illustrates vibration data 61 acquired by a vibration measuring unit 60 of the processing apparatus 1 illustrated in FIG. 4. FIG. 6 illustrates processed state vibration information 300-1 that is acquired by an information acquiring section 102 of a controller 100 of the processing apparatus 1 illustrated in FIG. 4 and that is stored in a storage section 103 thereof. Those parts illustrated in FIGS. 4 and 6 that are identical to those according to the first embodiment are denoted by identical reference characters and will be omitted from detailed description.

As illustrated in FIG. 4, the processing apparatus 1 according to the modification of the first embodiment includes the vibration measuring unit 60. According to the modification of the first embodiment, the vibration measuring unit 60 is incorporated in the processed state measuring unit 50. The vibration measuring unit 60 acquires the vibration data 61 (see FIG. 5) that represents vibration information of the processed state measuring unit 50, and outputs the acquired vibration data 61 to the controller 100. According to the modification of the first embodiment, therefore, the vibration information represents the vibration data 61 acquired from the vibration measuring unit 60. The vibration data 61 acquired by the vibration measuring unit 60 indicates changes in the intensity of the vibration (indicated on the vertical axis of FIG. 5) over time (indicated on the horizontal axis of FIG. 5). In FIG. 5, the intensity on the vertical axis of the vibration data 61 is illustrated in any unit. The vibration measuring unit 60 includes an acceleration sensor, e.g., a piezoelectric acceleration sensor, or the like, for example.

The information acquiring section 102 of the controller 100 of the processing apparatus 1 according to the modification of the first embodiment acquires the processed state information 51 of the workpiece 200 from the processed state measuring unit 50 and also acquires the vibration data 61 representing the vibration information from the vibration measuring unit 60 while acquiring the processed state information from the processed state measuring unit 50. The information acquiring section 102 calculates a maximum value, which corresponds to a vibration value and will hereinafter be referred to as "maximum vibration value 62," of the intensity of the vibration data 61 acquired as the vibration information from the vibration measuring unit 60. The information acquiring section 102 links the processed state information 51 acquired from the processed state measuring unit 50 and the maximum vibration value 62 of the vibration data 61 acquired as the vibration information from the vibration measuring unit 60, with each other in one-to-one correspondence, and stores them as processed state vibration information 300-1 in the storage section 103, as illustrated in FIG. 6.

According to the modification of the first embodiment, therefore, the vibration information represents the vibration data 61 acquired from the vibration measuring unit 60, as described above.

According to the modification of the first embodiment, further, the information acquiring section 102 decides whether or not the maximum vibration value 62 of the vibration data 61 acquired as the vibration information from the processing control section 101 is equal to or larger than a predetermined allowable value. The allowable value refers to a value depending on the amplitude of the vibrations of the processed state measuring unit 50 at which the reliability of the processed state information 51 acquired from the processed state measuring unit 50 is lowered.

If the information acquiring section 102 decides that the maximum vibration value 62 of the vibration data 61 acquired as the vibration information from the processing control section 101 is equal to or larger than the predetermined allowable value, then the information acquiring section 102 acquires again the processed state information 51 from the processed state measuring unit 50.

As with the first embodiment, the re-acquisition of the processed state information 51 from the processed state measuring unit 50 may be carried out by acquiring, from the processed state measuring unit 50, the processed state information 51 of a processed groove 208 next to the processed groove 208 whose processed state information 51 has been acquired from the processed state measuring unit 50, or may be carried out by acquiring, from the processed state measuring unit 50, the processed state information 51 of the same processed groove 208 as the processed groove 208 whose processed state information 51 has been acquired from the processed state measuring unit 50.

According to the modification of the first embodiment, for acquiring the processed state vibration information 300, as with the first embodiment, the information acquiring section 102 of the controller 100 acquires the processed state information 51 of the workpiece 200 from the processed state measuring unit 50 and also acquires the vibration data 61 representing the vibration information regarding vibrations of the processing apparatus 1 that are being produced while the information acquiring section 102 acquires the processed state information 51. Then, the information acquiring section 102 links the acquired processed state information 51 and the maximum vibration value 62 of the vibration data 61 with each other in one-to-one correspondence, and stores them as the processed state vibration information 300-1 in the storage section 103.

According to the modification of the first embodiment, further, if the information acquiring section 102 decides that the maximum vibration value 62 of the vibration data 61 acquired from the vibration measuring unit 60 is equal to or larger than the predetermined allowable value, then the information acquiring section 102 acquires again the processed state information 51 from the processed state measuring unit 50, links the re-acquired processed state information 51 and the maximum vibration value 62 of the vibration data 61 representing the vibration information with each other in one-to-one correspondence, stores them as the processed state vibration information 300-1 in the storage section 103.

The processing apparatus 1 according to the modification of the first embodiment links the processed state information 51 and the maximum vibration value 62 of the vibration data 61 representing the vibration information with each other in one-to-one correspondence, stores them as the processed state vibration information 300-1 in the storage section 103, decides whether or not the maximum vibration value 62 of the vibration data 61 linked with the processed state information 51 is equal to or larger than the allowable value, and acquires again the processed state information 51 only if the processed state information 51 of low reliability where the maximum vibration value 62 is equal to or larger than the allowable value is acquired. Therefore, the processing apparatus 1 according to the modification of the first embodiment makes it possible to acquire the processed state information 51 that is of high reliability while preventing a reduction in productivity, as with the first embodiment.

Second Embodiment

A processing apparatus according to a second embodiment of the present invention will be described below with reference to the drawings. FIG. 7 illustrates in perspective a structural example of the processing apparatus, denoted by 1, according to the second embodiment. Those parts illustrated in FIG. 7 that are identical to those according to the first embodiment are denoted by identical reference characters and will be omitted from detailed description.

As illustrated in FIG. 7, the processing apparatus 1 according to the second embodiment has a storage section 103 that stores a correlation 104 in advance. The correlation 104 represents a relation between processed state information 51 acquired when the processed state measuring unit 50 is free of vibrations and processed state information 51 acquired when the processed state measuring unit 50 undergoes vibrations. The processed state information 51 acquired when the processed state measuring unit 50 is free of vibrations refers to processed state information 51 acquired by the processed state measuring unit 50 as it measures information regarding a processed groove 208 in the workpiece 200 held on the holding unit 10 that is stationary while the components other than the processed state measuring unit and the holding unit 10 are not in operation.

According to the second embodiment, the processed state information 51 acquired when the processed state measuring unit 50 undergoes vibrations refers to processed state information 51 acquired by the processed state measuring unit 50 as it measures information regarding a processed groove 208 in the workpiece 200 held on the holding unit 10 when the operation state 301 of the processing apparatus 1 that represents vibration information is the predetermined operation state 302. The correlation 104 represents a relation of the processed state information 51 where the depth of the processed groove 208 represented by the processed state information 51 acquired when the processed state measuring unit 50 undergoes vibrations is smaller a predetermined depth than the depth of the processed groove 208 represented by the processed state information 51 acquired when the processed state measuring unit 50 is free of vibrations.

According to the second embodiment, for acquiring the processed state vibration information 300, as with the first embodiment, the information acquiring section 102 of the controller 100 acquires the processed state information 51 of the workpiece 200 from the processed state measuring unit 50 and also acquires the operation state 301 of the processing apparatus 1 representing the vibration information regarding vibrations of the processing apparatus 1 that are being produced while the information acquiring section 102 acquires the processed state information 51. Then, the information acquiring section 102 links the acquired processed state information 51 and the operation state 301 of the processing apparatus 1 representing the vibration information with each other in one-to-one correspondence, and stores them as the processed state vibration information 300 in the storage section 103.

According to the second embodiment, if the information acquiring section 102 decides that the operation state 301 of the processing apparatus 1 that represents the vibration information acquired from the processing control section 101 is the predetermined operation state 302, then the information acquiring section 102 corrects the processed state information 51 acquired from the processed state measuring unit 50, to the processed state information 51 acquired when the processed state measuring unit 50 is free of vibrations, on the basis of the correlation 104. The information acquiring section 102 corrects the depth of the processed groove 208 represented by the processed state information 51 acquired from the processed state measuring unit 50, such that the depth becomes smaller by the predetermined depth defined by the correlation 104.

The processing apparatus 1 according to the second embodiment links the processed state information 51 and the operation state 301 of the processing apparatus 1 representing the vibration information, with each other in one-to-one correspondence, stores them as the processed state vibration information 300 in the storage section 103, decides whether or not the operation state 301 of the processing apparatus 1 linked with the processed state information 51 is the predetermined operation state 302, and corrects the processed state information 51 of low reliability where the operation state 301 is decided as being the predetermined operation state 302, to the processed state information 51 acquired when the processed state measuring unit 50 is free of vibrations, on the basis of the correlation 104. Therefore, the processing apparatus 1 according to the second embodiment makes it possible to acquire the processed state information 51 that is of high reliability while preventing a reduction in productivity.

[Modification]

A processing apparatus according to a modification of the second embodiment will be described below with reference to the drawings. FIG. 8 illustrates a structural example of the processing apparatus, denoted by 1, according to the modification of the second embodiment. FIG. 9 schematically illustrates a correlation 104-1 stored in a storage section 103 of a controller 100 of the processing apparatus 1 illustrated in FIG. 8. Those parts illustrated in FIG. 8 that are identical to those according to the modification of the first embodiment and the second embodiment are denoted by identical reference characters and will be omitted from detailed description.

As illustrated in FIG. 8, the processing apparatus 1 according to the modification of the second embodiment includes a vibration measuring unit 60 as with the modification of the first embodiment. According to the modification of the second embodiment, the storage section 103 of the controller 100 stores the correlation 104 as with the second embodiment.

According to the modification of the second embodiment, for acquiring the processed state vibration information 300, as with the modification of the first embodiment, the information acquiring section 102 of the controller 100 acquires the processed state information 51 of the workpiece 200 from the processed state measuring unit 50 and also acquires the vibration data 61 representing the vibration information regarding vibrations of the processing apparatus 1 that are being produced while the information acquiring section 102 acquires the processed state information 51. Then, the information acquiring section 102 links the acquired processed state information 51 and the maximum vibration value 62 of the vibration data 61 representing the vibration information, with each other in one-to-one correspondence, and stores them as the processed state vibration information 300-1 in the storage section 103.

According to the modification of the second embodiment, if the information acquiring section 102 of the controller 100 decides that the maximum vibration value 62 of the vibration data 61 acquired as the vibration information from the vibration measuring unit is equal to or larger than the allowable value, then the information acquiring section 102 corrects the processed state information 51 acquired from the processed state measuring unit 50, to the processed state information 51 acquired when the processed state measuring unit 50 is free of vibrations, on the basis of the correlation 104. The information acquiring section 102 corrects the depth of the processed groove 208 represented by the processed state information 51 acquired from the processed state measuring unit 50, such that the depth becomes smaller by the predetermined depth defined by the correlation 104.

The processing apparatus 1 according to the modification of the second embodiment links the processed state information 51 and the maximum vibration value 62 of the vibration data 61 representing the vibration information, with each other in one-to-one correspondence, stores them as the processed state vibration information 300-1 in the storage section 103, decides whether or not the maximum vibration value 62 of the vibration data 61 linked with the processed state information 51 is equal to or larger than the allowable value, and corrects the processed state information 51 of low reliability where the maximum vibration value 62 is decided as equal to or larger than the allowable value, to the processed state information 51 acquired when the processed state measuring unit 50 is free of vibrations, on the basis of the correlation 104. Therefore, the processing apparatus 1 according to the modification of the second embodiment makes it possible to acquire the processed state information 51 that is of high reliability while preventing a reduction in productivity.

Further, with the processing apparatus 1 according to the modification of the second embodiment, for example, the storage section 103 may store the correlation 104-1 illustrated in FIG. 9, and the information acquiring section 102 may correct the processed state information 51 acquired from the processed state measuring unit 50, to the processed state information 51 acquired when the processed state measuring unit 50 is free of vibrations, on the basis of the correlation 104-1. The correlation 104-1 illustrated in FIG. 9 refers to a relation between the maximum vibration value 62 of the vibration data 61 acquired from the vibration measuring unit 60 and a corrective value 63 used in correcting the processed state information 51 acquired from the processed state measuring unit 50 to the processed state information 51 acquired when the processed state measuring unit 50 is free of vibrations. In FIG. 9, the horizontal axis represents the maximum vibration value 62 of the vibration data 61 acquired from the vibration measuring unit 60, and the vertical axis represents the corrective value 63. The correlation 104-1 illustrated in FIG. 9 indicates that the larger the maximum vibration value 62 of the vibration data 61 is, the larger the corrective value 63 becomes.

In this case, the information acquiring section 102 does not decide whether or not the maximum vibration value 62 of the vibration data 61 is equal to or larger than the allowable value, but corrects the processed state information 51 acquired from the processed state measuring unit 50, to the processed state information 51 acquired when the processed state measuring unit 50 is free of vibrations, on the basis of the correlation 104-1. Specifically, according to the modification of the second embodiment, the information acquiring section 102 corrects the depth of the processed groove 208 represented by the processed state information 51 acquired from the processed state measuring unit 50, such that the depth becomes smaller by the corrective value 63 associated with the maximum vibration value 62 of the vibration data 61 representing the vibration information, on the basis of the correlation 104-1.

According to the second embodiment and the modification of the second embodiment, the information acquiring section 102 corrects the depth of the processed groove 208 represented by the processed state information 51 acquired from the processed state measuring unit 50, on the basis of the correlations 104 and 104-1. However, the information acquiring section 102 may not necessarily correct the depth of the processed groove 208, and may correct the minimum width of the processed groove 208 at the face side 202, the maximum width of the processed groove 208 at the face side 202, the width of the processed groove 208 at the bottom surface thereof, the width of the processed groove 208 at a position spaced a predetermined distance from the face side 202 toward the bottom surface, or the like.

Third Embodiment

A processing apparatus according to a third embodiment of the present invention will be described below with reference to the drawings. FIG. 10 illustrates in perspective a structural example of the processing apparatus, denoted by 1, according to the third embodiment. Those parts illustrated in FIG. 10 that are identical to those according to the first and second embodiments are denoted by identical reference characters and will be omitted from detailed description.

As illustrated in FIG. 10, the processing apparatus 1 according to the third embodiment has a storage section 103 that stores a standard decision criterion 105. The standard decision criterion 105 refers to a decision criterion used in deciding whether or not a processed result is acceptable, from the processed state information 51 of the workpiece 200 if the operation state 301 of the processing apparatus 1 that represents vibration information is decided as being not the predetermined operation state 302. According to the third embodiment, the standard decision criterion 105 represents upper and lower limit values for the depth of the processed groove 208, and is used to decide that the processed result is acceptable, if the depth of the processed groove 208 is in the range of the lower limit value to the upper limit value, and decide that the processed result is unacceptable, if the depth of the processed groove 208 is smaller than the lower limit value or larger than the upper limit value.

According to the third embodiment, for acquiring the processed state vibration information 300, as with the first embodiment, the information acquiring section 102 of the controller 100 acquires the processed state information 51 of the workpiece 200 from the processed state measuring unit 50, acquires the operation state 301 of the processing apparatus 1 that represents vibration information regarding vibrations of the processing apparatus 1 that are being produced while the information acquiring section 102 acquires the processed state information 51, links the acquired processed state information 51 and the operation state 301 of the processing apparatus 1 representing the vibration information, with each other in one-to-one correspondence, and stores them as processed state vibration information 300 in the storage section 103.

Further, the information acquiring section 102 acquires the standard decision criterion 105 from the storage section 103, and decides whether or not the operation state 301 of the processing apparatus 1 that represents the vibration information acquired from the processing control section 101 is the predetermined operation state 302. If the information acquiring section 102 decides that the operation state 301 of the processing apparatus 1 that represents the vibration information acquired from the processing control section 101 is the predetermined operation state 302, then the information acquiring section 102 reduces the lower limit value of the standard decision criterion 105 by a predetermined value, thereby generating a new corrected lower limit value, increases the upper limit value of the standard decision criterion 105 by a predetermined value, thereby generating a new corrected upper limit value, and sets the standard decision criterion 105 to a corrected decision criterion representing the corrected lower limit value and the corrected upper limit value.

The corrected decision criterion refers to a decision criterion used in deciding whether or not a processed result is acceptable, from the processed state information 51 of the workpiece 200, and is used to decide that the processed result is acceptable, if the depth of the processed groove 208 is in the range of the corrected lower limit value to the corrected upper limit value, and decide that the processed result is unacceptable, if the depth of the processed groove 208 is smaller than the corrected lower limit value or larger than the corrected upper limit value.

According to the third embodiment, if the information acquiring section 102 decides that the operation state 301 of the processing apparatus 1 that represents the vibration information acquired from the processing control section 101 is the predetermined operation state 302, then the information acquiring section 102 decides whether or not the processed state information 51 acquired from the processed state measuring unit 50 falls in the corrected decision criterion. If the information acquiring section 102 decides that the processed state information 51 falls in the corrected decision criterion, then the information acquiring section 102 determines the processed result of the processed groove 208 in the workpiece 200 as acceptable. If the information acquiring section 102 decides that the processed state information 51 does not fall in the corrected decision criterion, then the information acquiring section 102 determines the processed result of the processed groove 208 in the workpiece 200 as unacceptable.

According to the third embodiment, if the information acquiring section 102 decides that the operation state 301 of the processing apparatus 1 that represents the vibration information acquired from the processing control section 101 is not the predetermined operation state 302, then the information acquiring section 102 decides whether or not the processed state information 51 acquired from the processed state measuring unit 50 falls in the standard decision criterion 105. If the information acquiring section 102 decides that the processed state information 51 falls in the standard decision criterion 105, then the information acquiring section 102 determines the processed result of the processed groove 208 in the workpiece 200 as acceptable. If the information acquiring section 102 decides that the processed state information 51 does not fall in the standard decision criterion 105, then the information acquiring section 102 determines the processed result of the processed groove 208 in the workpiece 200 as unacceptable.

If the information acquiring section 102 determines the processed result of the processed groove 208 in the workpiece 200 as unacceptable, then the information acquiring section 102 energizes the signaling unit to indicate the unacceptable processed result to the operator. According to the third embodiment, as described above, the controller 100 is able to establish a decision criterion used in determining whether or not the processed result is acceptable, from the processed state information 51 of the workpiece 200, and the decision criterion is variable depending on the magnitude of vibrations represented by the operation state 301 of the processing apparatus 1 that represents the vibration information linked with the processed state information 51.

The processing apparatus 1 according to the third embodiment links the processed state information 51 and the operation state 301 of the processing apparatus 1 that represents the vibration information, with each other in one-to-one correspondence, stores them as processed state vibration information 300 in the storage section 103, and determines whether or not the processed result is acceptable, from the processed state information 51. Further, the processing apparatus 1 according to the third embodiment decides whether or not the operation state 301 of the processing apparatus 1 that is linked with the processed state information 51 is the predetermined operation state 302, and establishes the corrected decision criterion for the processed result of the processed state information 51 that is of low reliability where the operation state 301 is decided as being the predetermined operation state 302, such that the decision criterion is wider than the standard decision criterion 105 for the processed result of the processed state information 51 that is of high reliability where the operation state 301 is decided as being not the predetermined operation state 302. Consequently, the processing apparatus 1 is able to prevent the signaling unit from being energized by erroneously determining the processed result as unacceptable though an acceptable processed groove 208 has actually been formed in the workpiece 200. Therefore, the processing apparatus 1 according to the third embodiment makes it possible to acquire the processed state information 51 that is of high reliability while preventing a reduction in productivity.

[Modification]

A processing apparatus according to a modification of the third embodiment will be described below with reference to the drawings. FIG. 11 illustrates a structural example of the processing apparatus, denoted by 1, according to the modification of the third embodiment. Those parts illustrated in FIG. 11 that are identical to those according to the modification of the first embodiment and the third embodiment are denoted by identical reference characters and will be omitted from detailed description.

As illustrated in FIG. 11, the processing apparatus 1 according to the modification of the third embodiment includes a vibration measuring unit 60, as with the modification of the first embodiment. Further, the processing apparatus 1 according to the modification of the third embodiment has a storage section 103 that stores a standard decision criterion 105, as with the third embodiment.

According to the modification of the third embodiment, for acquiring the processed state vibration information 300, as with the modification of the first embodiment, the information acquiring section 102 of the controller 100 acquires the processed state information 51 of the workpiece 200 from the processed state measuring unit 50 and also acquires the vibration data 61 representing the vibration information regarding vibrations of the processing apparatus 1 that are being produced while the information acquiring section 102 acquires the processed state information 51. Then, the information acquiring section 102 links the acquired processed state information 51 and the maximum vibration value 62 of the vibration data 61 representing the vibration information, with each other in one-to-one correspondence, and stores them as the processed state vibration information 300-1 in the storage section 103.

Further, the information acquiring section 102 acquires the standard decision criterion 105 from the storage section 103 and decides whether or not the maximum vibration value 62 of the vibration data 61 acquired as the vibration information from the vibration measuring unit 60 is equal to or larger than the allowable value. If the information acquiring section 102 that has acquired the standard decision criterion 105 from the storage section 103 decides that the maximum vibration value 62 of the vibration data 61 acquired as the vibration information from the vibration measuring unit 60 is equal to or larger than the allowable value, then the information acquiring section 102 reduces the lower limit value of the standard decision criterion 105 by a predetermined value, thereby generating a new corrected lower limit value, increases the upper limit value of the standard decision criterion 105 by a predetermined value, thereby generating a new corrected upper limit value, and sets the standard decision criterion 105 to a corrected decision criterion representing the corrected lower limit value and the corrected upper limit value.

The corrected decision criterion refers to a decision criterion used in deciding whether or not a processed result is acceptable, from the processed state information 51 of the workpiece 200, and is used to decide that the processed result is acceptable, if the depth of the processed groove 208 is in the range of the corrected lower limit value to the corrected upper limit value, and decide that the processed result is unacceptable, if the depth of the processed groove 208 is smaller than the corrected lower limit value or larger than the corrected upper limit value.

According to the modification of the third embodiment, if the information acquiring section 102 decides that the maximum vibration value 62 of the vibration data 61 acquired as the vibration information from the vibration measuring unit 60 is equal to or larger than the allowable value, then the information acquiring section 102 decides whether or not the processed state information 51 acquired from the processed state measuring unit 50 falls in the corrected decision criterion. If the information acquiring section 102 decides that the processed state information 51 falls in the corrected decision criterion, then the information acquiring section 102 determines the processed result of the processed groove 208 in the workpiece 200 as acceptable. If the information acquiring section 102 decides that the processed state information 51 does not fall in the corrected decision criterion, then the information acquiring section 102 determines the processed result of the processed groove 208 in the workpiece 200 as unacceptable.

According to the modification of the third embodiment, if the information acquiring section 102 decides that the maximum vibration value 62 of the vibration data 61 acquired as the vibration information from the vibration measuring unit 60 is not equal to or larger than the allowable value, then the information acquiring section 102 decides whether or not the processed state information 51 acquired from the processed state measuring unit 50 falls in the standard decision criterion 105. If the information acquiring section 102 decides that the processed state information 51 falls in the standard decision criterion 105, then the information acquiring section 102 determines the processed result of the processed groove 208 in the workpiece 200 as acceptable. If the information acquiring section 102 decides that the processed state information 51 does not fall in the standard decision criterion 105, then the information acquiring section 102 determines the processed result of the processed groove 208 in the workpiece 200 as unacceptable.

If the information acquiring section 102 determines the processed result of the processed groove 208 in the workpiece 200 as unacceptable, then the information acquiring section 102 energizes the signaling unit to indicate the unacceptable processed result to the operator. According to the modification of the third embodiment, as described above, as with the third embodiment, the controller 100 is able to establish a decision criterion used in determining whether or not the processed result is acceptable, from the processed state information 51 of the workpiece 200, and the decision criterion is variable depending on the magnitude of vibrations represented by the operation state 301 of the processing apparatus 1 that represents the vibration information linked with the processed state information 51.

The processing apparatus 1 according to the modification of the third embodiment links the processed state information 51 and the maximum vibration value 62 of the vibration data 61 that represents the vibration information, with each other in one-to-one correspondence, stores them as processed state vibration information 300-1 in the storage section 103, and determines whether or not the processed result is acceptable, from the processed state information 51. Further, the processing apparatus 1 according to the modification of the third embodiment decides whether or not the maximum vibration value 62 of the vibration data 61 linked with the processed state information 51 is equal to or larger than the allowable value, and establishes the corrected decision criterion for the processed result of the processed state information 51 that is of low reliability where the maximum vibration value 62 of the vibration data 61 is decided as being equal to or larger than the allowable value, such that the decision criterion is wider than the standard decision criterion 105 for the processed result of the processed state information 51 that is of high reliability where the maximum vibration value 62 of the vibration data 61 is decided as being not equal to or larger than the allowable value. Consequently, the processing apparatus 1 is able to prevent the signaling unit from being energized by erroneously determining the processed result as unacceptable though an acceptable processed groove 208 has actually been formed in the workpiece 200. Therefore, the processing apparatus 1 according to the modification of the third embodiment makes it possible to acquire the processed state information 51 that is of high reliability while preventing a reduction in productivity.

According to the third embodiment and the modification of the third embodiment, if the information acquiring section 102 decides that the depth of the processed groove 208 represented by the processed state information 51 falls in the corrected decision criterion or the standard decision criterion 105, then the information acquiring section 102 decides that the processed result of the processed groove 208 in the workpiece 200 is acceptable. Conversely, if the information acquiring section 102 decides that the depth of the processed groove 208 represented by the processed state information 51 does not fall in the corrected decision criterion or the standard decision criterion 105, then the information acquiring section 102 decides that the processed result of the processed groove 208 in the workpiece 200 is unacceptable. However, the information acquiring section 102 may decide whether or not the processed result is acceptable, by deciding whether or not, not necessarily the depth of the processed groove 208, but the minimum width of the processed groove 208 at the face side 202, the maximum width of the processed groove 208 at the face side 202, the width of the processed groove 208 at the bottom surface thereof, the width of the processed groove 208 at a position spaced a predetermined distance from the face side 202 toward the bottom surface, or the like falls in the corrected decision criterion or whether or not it falls in the standard decision criterion 105.

With the processing apparatus 1 according to the third embodiment and the modification of the third embodiment, the information acquiring section 102 generates a corrected decision criterion. However, the operator may establish a corrected decision criterion as desired.

The present invention is not limited to the above embodiments and modifications thereof. Various changes and modifications may be made in the embodiments and modifications thereof without departing from the scope of the invention. For example, the processing apparatus 1 may apply the pulsed laser beam 21 whose wavelength is transmittable through the substrate 201 of the workpiece 200, to the workpiece 200, to form modified layers, i.e., processed marks, in the workpiece 200 along the projected dicing lines 203. The modified layers refer to regions where their density, refractive index, mechanical strength, and other physical properties are different from those around the regions, and include melted regions, cracked regions, dielectric-breakdown regions, varied-refractive-index regions, or regions where a mixture of those regions is prevalent. Providing these modified layers are to be formed in the workpiece 200, the processed state measuring unit 50 may include an infrared camera, for example, for capturing an image of a two-dimensional shape, which may be referred to as "planar shape," of modified layers as processed state information 51, or an image of a two-dimensional shape or planar shape of cracks developed from modified layers toward the face side 202 as the processed state information 51. The vibration measuring unit 60 may acquire vibration data 61 as well as an operation state.

According to the first embodiment described above, the processing apparatus 1 acquires the processed state vibration information 300 after the kerf check has been carried out, and stores the acquired processed state vibration information 300 in the storage section 103. However, the acquisition of the processed state vibration information 300 is not limited to such a timing. After having processed each workpiece 200 at all the projected dicing lines 203 with the laser beam 21, the processing apparatus 1 may acquire the processed state information 51 at a predetermined position in the workpiece 200 from the processed state measuring unit 50, acquire the processed state vibration information 300, and store the acquired processed state vibration information 300 in the storage section 103. For example, after having processed one lot of workpieces 200 with the laser beam 21, the processing apparatus 1 may acquire the processed state information 51 at a predetermined position in the workpiece 200 from the processed state measuring unit 50, acquire the processed state vibration information 300, and store the acquired processed state vibration information 300 in the storage section 103.

Moreover, when the processed state information 51 at a predetermined position in the workpiece 200 is to be acquired from the processed state measuring unit 50, the face side 202 of the workpiece 200 may have been coated with a protective film or may not have been coated with a protective film. The predetermined position on the workpiece 200 where the processed state information 51 is to be acquired may include a plurality of positions including positions where metal pieces such as test element group (TEG) chips are present on projected dicing lines 203 and positions where no such metal pieces are present.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing apparatus comprising:
a holding unit for holding a workpiece thereon;
a processing unit for processing the workpiece held on the holding unit;
a moving mechanism for moving the holding unit and the processing unit relatively to each other;
a processed state measuring unit for measuring a processed state of the workpiece; and
a controller for controlling the processing unit, the moving mechanism, and the processed state measuring unit,
wherein the controller acquires processed state information of the workpiece from the processed state measuring unit, acquires vibration information regarding vibrations associated with a plurality of predetermined operation states that are produced while the processed state information is acquired, links the processed state information and the vibration information that have been acquired with each other, stores the processed state information and the vibration information that have been linked with each other and determines if the vibration information of an operation state of the processing unit is the same as the vibration information associated with one of the predetermined operation states.

2. The processing apparatus according to claim 1, further comprising: a vibration measuring unit for measuring vibration data representing the vibration information.

3. The processing apparatus according to claim 2, wherein the controller acquires again processed state information if the controller decides that a vibration value is equal to or larger than an allowable value, from the acquired vibration information.

4. The processing apparatus according to claim 1, wherein the controller stores in advance a correlation between processed state information acquired when there are no vibrations and processed state information acquired when there are vibrations, and corrects processed state information that has been newly acquired, to the processed state information acquired when there are no vibrations, on a basis of the correlation.

5. The processing apparatus according to claim 1, wherein the controller is able to establish a decision criterion used in determining whether or not a processed result is acceptable, from the processed state information of the workpiece, and the decision criterion is variable depending on a magnitude of vibrations represented by the vibration information linked with the processed state information.

6. The processing apparatus according to claim 1, wherein the processed state measuring unit includes a three-dimensional measuring unit for three-dimensionally measuring the workpiece along an X-axis, a Y-axis, and a Z-axis that extend perpendicularly to one another.

7. A processing apparatus comprising:
a holding unit for holding a workpiece thereon;
a processing unit for processing the workpiece held on the holding unit;
a moving mechanism for moving the holding unit and the processing unit relatively to each other;
a processed state measuring unit for measuring a processed state of the workpiece; and
a controller for controlling the processing unit, the moving mechanism, and the processed state measuring unit,
wherein the controller acquires processed state information of the workpiece from the processed state measuring unit, acquires vibration information regarding vibrations that are being produced while the processed state information is acquired, links the processed state information and the vibration information that have been acquired with each other, and stores the processed state information and the vibration information that have been linked with each other, wherein the vibration information is represented by an operation state of the processing apparatus, and
wherein the controller acquires again processed state information if the controller decides that the acquired vibration information is represented by a predetermined operation state.

8. The processing apparatus according to claim 7, wherein the controller acquires again processed state information if the controller decides that a vibration value is equal to or larger than an allowable value, from the acquired vibration information.

9. The processing apparatus according to claim 7, wherein the controller stores in advance a correlation between processed state information acquired when there are no vibrations and processed state information acquired when there are vibrations, and corrects processed state information that has been newly acquired, to the processed state information acquired when there are no vibrations, on a basis of the correlation.

10. The processing apparatus according to claim 7, wherein the controller is able to establish a decision criterion used in determining whether or not a processed result is acceptable, from the processed state information of the workpiece, and the decision criterion is variable depending on a magnitude of vibrations represented by the vibration information linked with the processed state information.

11. The processing apparatus according to claim 7, wherein the processed state measuring unit includes a three-dimensional measuring unit for three-dimensionally measuring the workpiece along an X-axis, a Y-axis, and a Z-axis that extend perpendicularly to one another.

12. A processing apparatus comprising:

a holding unit for holding a workpiece thereon;

a processing unit for processing the workpiece held on the holding unit;

a moving mechanism for moving the holding unit and the processing unit relatively to each other;

a processed state measuring unit for measuring a processed state of the workpiece;

a vibration measuring unit for measuring vibration data representing vibration information associated with the processed state of the workpiece; and a controller for controlling the processing unit, the moving mechanism, the vibration measuring unit and the processed state measuring unit, wherein the controller acquires processed state information of the workpiece from the processed state measuring unit, acquires vibration information regarding vibrations that are being produced while the processed state information is acquired, links the processed state information and the vibration information that have been acquired with each other, and stores the processed state information and the vibration information that have been linked with each other and acquires again processed state information if the controller decides that a vibration value is equal to or larger than an allowable value, from the acquired vibration information.

13. The processing apparatus according to claim 12, wherein the controller stores in advance a correlation between processed state information acquired when there are no vibrations and processed state information acquired when there are vibrations, and corrects processed state information that has been newly acquired, to the processed state information acquired when there are no vibrations, on a basis of the correlation.

14. The processing apparatus according to claim 12, wherein the controller is able to establish a decision criterion used in determining whether or not a processed result is acceptable, from the processed state information of the workpiece, and the decision criterion is variable depending on a magnitude of vibrations represented by the vibration information linked with the processed state information.

15. The processing apparatus according to claim 12, wherein the processed state measuring unit includes a three-dimensional measuring unit for three-dimensionally measuring the workpiece along an X-axis, a Y-axis, and a Z-axis that extend perpendicularly to one another.

* * * * *